United States Patent
Penno et al.

(10) Patent No.: US 10,171,350 B2
(45) Date of Patent: Jan. 1, 2019

(54) GENERATING PACKETS IN A REVERSE DIRECTION OF A SERVICE FUNCTION CHAIN

(71) Applicant: CISCO TECHNOLOGY, INC., San Jose, CA (US)

(72) Inventors: Reinaldo Penno, San Ramon, CA (US); Carlos M. Pignataro, Raleigh, NC (US); Paul Quinn, Wellesley, MA (US); Hung The Chau, Highland, CA (US); Chui-Tin Yen, San Jose, CA (US); Vivek Kansal, San Jose, CA (US); Jianxin Wang, Saratoga, CA (US); Kent K. Leung, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 18 days.

(21) Appl. No.: 15/160,804

(22) Filed: May 20, 2016

(65) Prior Publication Data

US 2017/0317926 A1    Nov. 2, 2017

Related U.S. Application Data

(60) Provisional application No. 62/328,474, filed on Apr. 27, 2016.

(51) Int. Cl.
| | |
|---|---|
| H04L 12/721 | (2013.01) |
| H04L 12/703 | (2013.01) |
| H04L 12/911 | (2013.01) |
| H04L 12/801 | (2013.01) |
| H04L 12/715 | (2013.01) |
| H04L 12/851 | (2013.01) |

(52) U.S. Cl.
CPC .............. *H04L 45/36* (2013.01); *H04L 45/26* (2013.01); *H04L 45/28* (2013.01); *H04L 45/64* (2013.01); *H04L 45/70* (2013.01); *H04L 47/10* (2013.01); *H04L 47/726* (2013.01); *H04L 47/2441* (2013.01); *H04L 2212/00* (2013.01)

(58) Field of Classification Search
CPC ......... H04L 45/36; H04L 45/64; H04L 47/10; H04L 45/26; H04L 45/70; H04L 45/28; H04L 47/726; H04L 47/2441; H04L 2212/00

See application file for complete search history.

(56) References Cited

U.S. PATENT DOCUMENTS

| | | | |
|---|---|---|---|
| 2003/0202469 A1* | 10/2003 | Cain | H04L 45/20 370/230 |
| 2005/0091396 A1* | 4/2005 | Nilakantan | H04L 45/04 709/232 |
| 2014/0334488 A1 | 11/2014 | Guichard et al. | |

OTHER PUBLICATIONS

Maino, F., et al., "Generic Protocol Extension for VXLAN," Network Working Group Internet Draft, draft-ietf-nvo-vxlan-gpe-03, Oct. 26=5, 2016; 16 pages.

(Continued)

*Primary Examiner* — Omar J Ghowrwal

(57) ABSTRACT

Embodiments are directed to receiving an original packet at a service function; determining, for a reverse packet, a reverse service path identifier for a previous hop on a service function chain; determining, for the reverse packet, a service index for the reverse service path identifier; and transmitting the reverse packet to the previous hop on the service function chain.

22 Claims, 11 Drawing Sheets

(56) References Cited

OTHER PUBLICATIONS

Halpern, J., et al., "Service Function Chaining (SFC) Architecture," Internet Engineering Task Force (IETF) RFC 7665, Oct. 2015; 32 pages.
Quinn, P., et al., "Network Service Header," Service Function Chaining Internet Draft, draft-ietf-sfc-nsh-12.txt, Feb. 23, 2017; 37 pages.
Penno, R., et al., "Packet Generation in Service Function Chains," Internet Draft, Expires Mar. 24, 2016, Sep. 21, 2015, 19 pages; https://tools.ietf.org/html/draft-penno-sfc-packet-00.
Penno, R., et al., "Packet Generation in Service Function Chains," Internet Draft, Expires Mar. 26, 2016, Sep. 23, 2015, 21 pages; https://tools.ietf.org/html/draft-penno-sfc-packet-01.
Penno, R., et al., "Packet Generation in Service Function Chains," Internet Draft, Expires Apr. 7, 2016, Oct. 5, 2015, 22 pages; https://tools.ietf.org/html/draft-penno-sfc-packet-02.
International Search Report and Written Opinion in corresponding International Application No. PCT/US2017/029666, dated Aug. 29, 2017, 12 pages.
E. Wang, et al., "Service Function Chaining Use Cases for Network Security", Mar. 17, 2016, XP055398695, retrieved from the internet: URL: https://tools.ietf.org/pdf/draft-wang-sfc-ns-use-cases-01.pdf, [retrieved on Feb. 2, 2018], 20 pages.

* cited by examiner

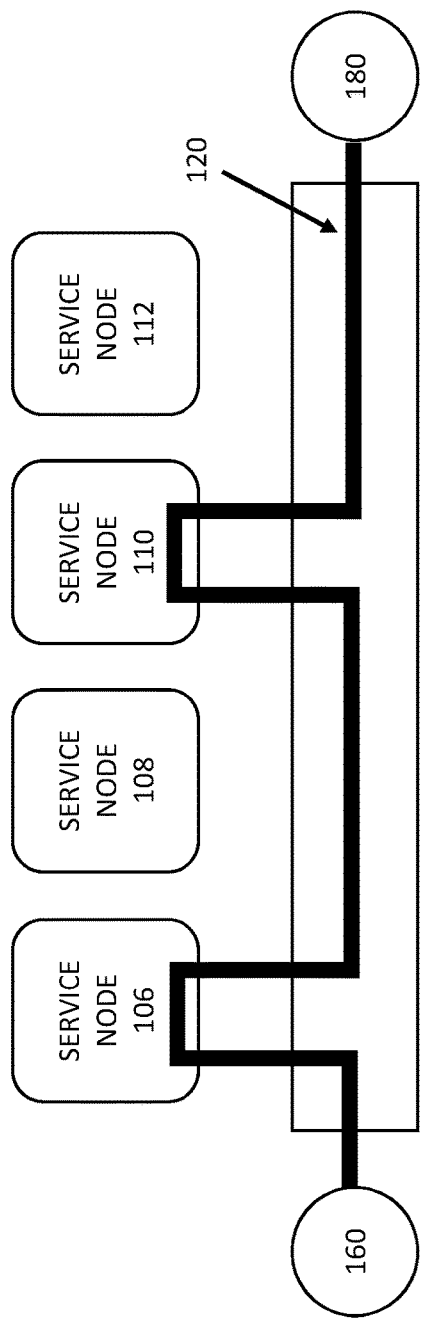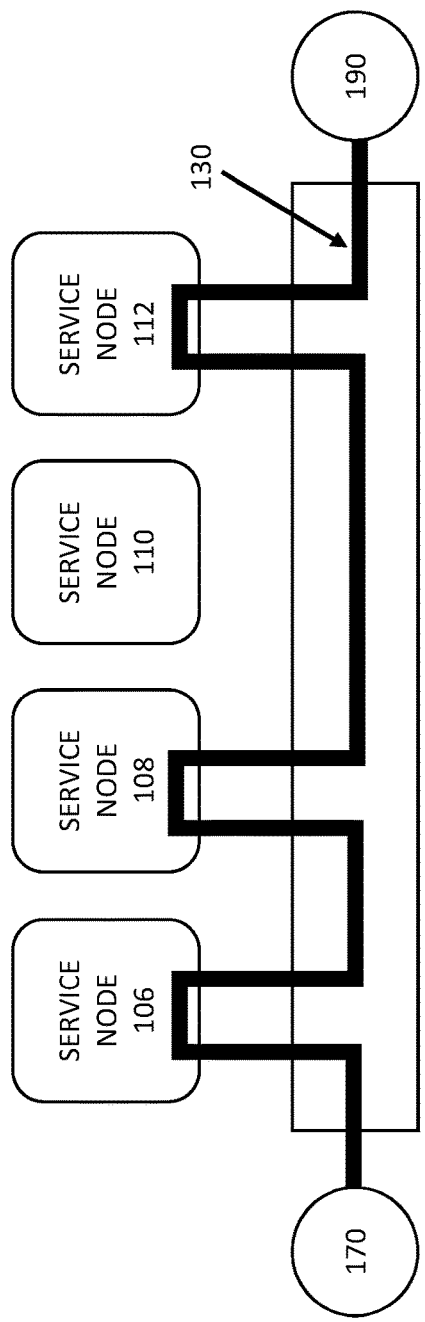

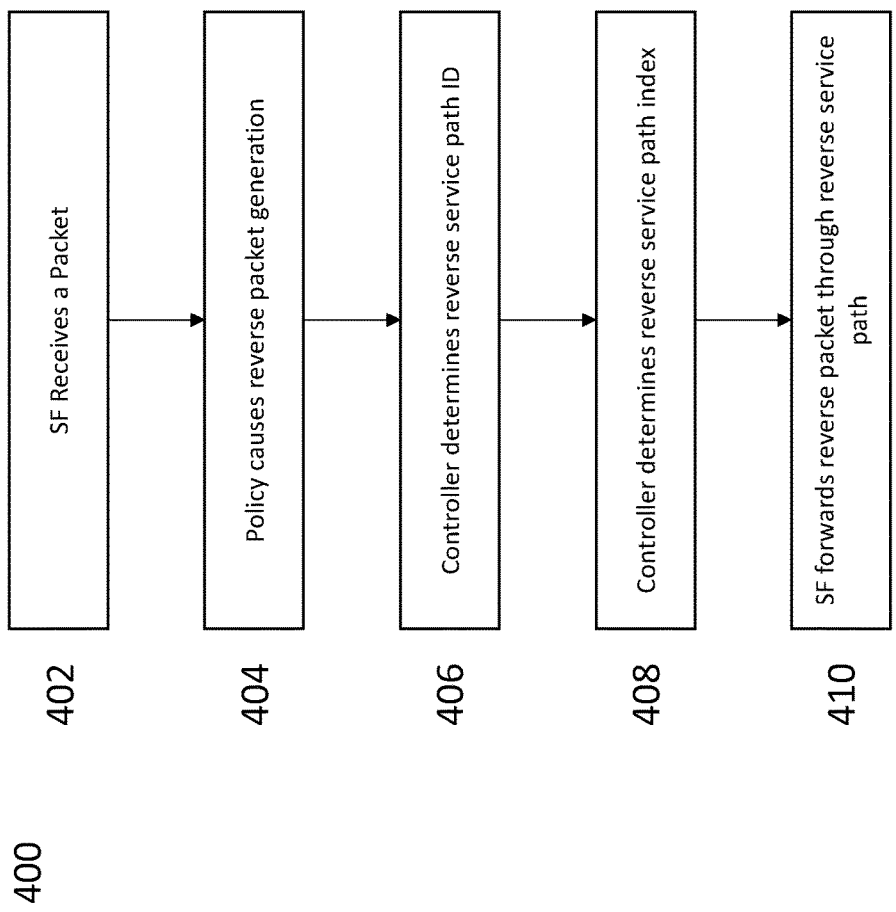

US 10,171,350 B2

GENERATING PACKETS IN A REVERSE DIRECTION OF A SERVICE FUNCTION CHAIN

CROSS REFERENCE TO RELATED APPLICATION

This application claims the benefit of priority under 25 U.S.C. § 119(2) to U.S. Provisional Application Ser. No. 62/328,474 entitled "GENERATING PACKETS IN A REVERSE DIRECTION OF A SERVICE FUNCTION CHAIN" filed Apr. 27, 2016, which is hereby incorporated by reference in its entirety.

FIELD

This disclosure pertains to service function chaining and generating packets in a reverse direction of a service function chain.

BACKGROUND

In computer networking, network administrators are often concerned with how to best route traffic flows from one end point to another end point across a network. When provisioning a route for a traffic flow, administrators may implement policies to ensure that certain service functions are applied to the packet or the traffic flow as it traverses across the network. Service functions can provide security, wide area network (WAN) acceleration, and load balancing. These service functions can be implemented at various points in the network infrastructure, such as the wide area network, data center, campus, etc. Network elements providing these service functions are generally referred to as "service nodes."

Traditionally, service node deployment is dictated by the network topology. For instance, firewalls are usually deployed at the edge of an administrative zone for filtering traffic leaving or entering the particular zone according to a policy for that zone. With the rise of virtual platforms and more agile networks, service node deployment can no longer be bound by the network topology. To enable service nodes to be deployed anywhere on a network, a solution called Service Function Chaining (SFC) Architecture and Network Service Header (NSH) have been provided to encapsulated packets or frames to prescribe service paths for traffic flows through the appropriate service nodes. Specifically, Network Service Headers provide data plane encapsulation that utilizes the network overlay topology used to deliver packets to the requisite services.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIGS. 1B-C is a schematic block diagram of different service paths realized using service function chaining, according to some embodiments of the disclosure;

FIG. 4 is a schematic diagram of a network service header in accordance with embodiments of the present disclosure;

FIG. 11 is a process flow diagram for making symmetric an asymmetric forward and reverse service path in accordance with embodiments of the present disclosure.

DETAILED DESCRIPTION

This disclosure describes providing the ability for a service function to generate a packet mid-service chain back to the source using a NSH.

Service Functions like Firewall, NAT, Proxies and Intrusion Detection generate packets like ICMP Errors, TCP Resets and TCP SYN-ACK to the source of the current in-process packet. This disclosure describe sending return packets to a source in a service function chain environment.

In service chain environments, generated return packets traverse the service path in the reverse order as that of the original packet. At the outset, a set of requirements are met in order to allow a packet to make its way back to its source through the service path:

a. A symmetric path-id is established;

b. At a minimum, the SF needs to be able encapsulate such error or proxy packets in an encapsulation transport, such as VXLAN-GPE+NSH header; and c. The SF needs to be able to determine, directly or indirectly, the symmetric path id and associated next service-hop index.

Basics of Network Service Chaining or Service Function Chains in a Network

To accommodate agile networking and flexible provisioning of network nodes in the network, Service Function Chains (SFC) can be used to ensure an ordered set of Service Functions (SF) to be applied to packets and/or frames of a traffic flow. SFCs provides a method for deploying SFs in a way that enables dynamic ordering and topological independence of those SFs. A service function chain can define an ordered set of service functions that is applied to packets and/or frames of a traffic flow, where the ordered set of service functions are selected as a result of classification. The implied order may not be a linear progression as the architecture allows for nodes that copy to more than one branch. The term service chain is often used as shorthand for service function chain.

Figure 1A:
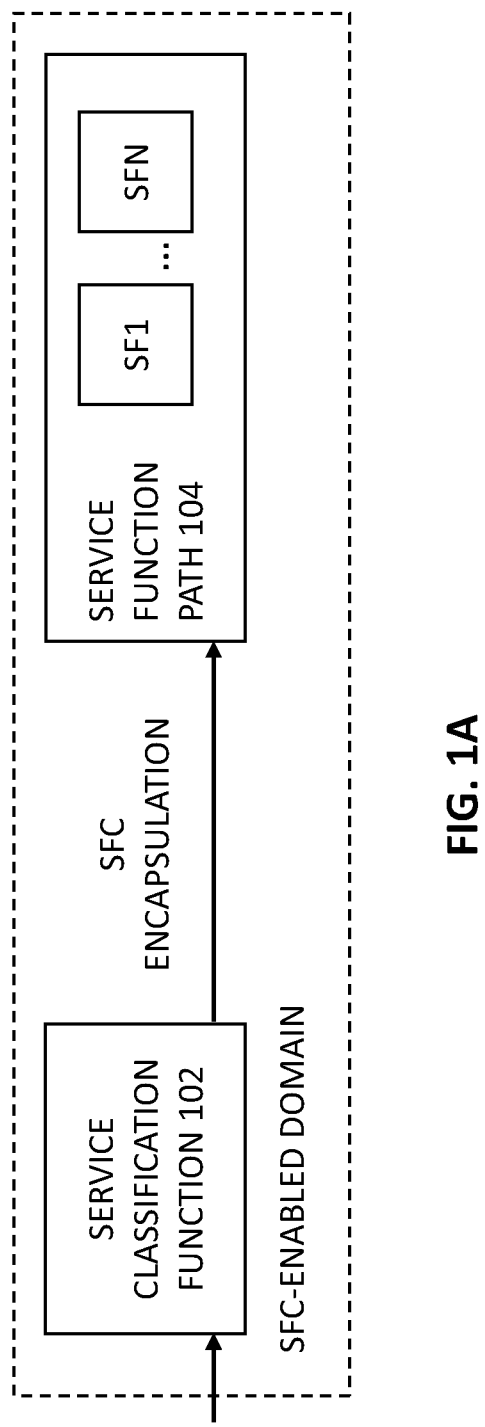
FIG. 1A is a schematic block diagram of a Service Function Chain (SFC), which may include an initial Classification function, as an entry point into a Service Function Path (SFP), according to some embodiments of the disclosure.

FIG. 1A illustrates a Service Function Chain (SFC), which may include an initial service classification function 102, as an entry point into a Service Function Path (SFP) 104 (or service path). The (initial) service classification function 102 prescribes a service path, and encapsulates a packet or frame with the service path information which identifies the service path. The classification potentially adds metadata, or shared context, to the SFC encapsulation part of the packet or frame. The service function path 104 may include a plurality of service functions (shown as "SF1", . . . "SFN"), implemented or provided by one or more service nodes.

A service function can be responsible for specific treatment of received packets. A service function can act at the network layer or other OSI layers (e.g., application layer, presentation layer, session layer, transport layer, data link layer, and physical link layer). A service function can be a virtual instance or be embedded in a physical network element such as a service node. When a service function or other modules of a service node is executed by the at least one processors of the service node, the service function or other modules can be configured to implement any one of the methods described herein. Multiple service functions can be embedded in the same network element. Multiple instances of the service function can be enabled in the same administrative SFC-enabled domain. A non-exhaustive list of SFs includes: firewalls, WAN and application acceleration, Deep Packet Inspection (DPI), server load balancers (SLBs), NAT44, NAT64, HOST_ID injection, HTTP Header Enrichment functions, TCP optimizer, application delivery controllers (ADCs) etc. An SF may be SFC encapsulation aware, that is it receives, and acts on information in the SFC encapsulation, or unaware in which case data forwarded to the service does not contain the SFC encapsulation.

A Service Node (SN) can be a physical network element (or a virtual element embedded on a physical network element) that hosts one or more service functions (SFs) and has one or more network locators associated with it for reachability and service delivery. In many standardization documents, "service functions" can refer to the service nodes described herein as having one or more service functions hosted thereon. Service Function Path (SFP) (or sometimes referred simply as service path) relates to the instantiation of a SFC in the network. Packets follow a service path from a classifier through the requisite service functions.

FIGS. 1B-C illustrate different service paths realized using service function chaining. These service paths can be implemented by encapsulating packets of a traffic flow with a network service header (NSH) or some other suitable packet header which specifies a desired service path (e.g., by identifying a particular service path using service path information in the NSH). In the example shown in FIG. 1B, a service path 120 can be provided between end point 160 and endpoint 180 through service node 106 and service node 110. In the example shown in FIG. 1C, a service path 130 (a different instantiation) can be provided between end point 170 and endpoint 190 through service node 106, service node 108, and service node 112.

Network Service Header (NSH) Encapsulation

Generally speaking, an NSH includes service path information, which can identify or prescribe a particular service path (an instance of a service function chain), and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow.

Figure 2:
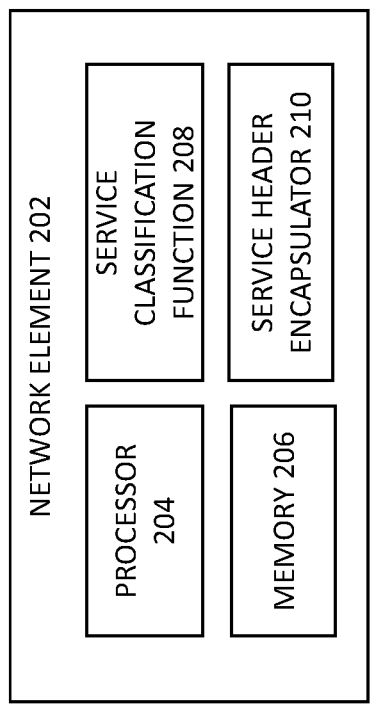
FIG. 2 is a schematic block diagram of a system view of a Service Chain Function-aware network element for prescribing a service path of a traffic flow, according to some embodiments of the disclosure.

FIG. 2 shows a system view of SFC-aware network element, e.g., such as a (initial) service classifier (SCL), for prescribing a service path of a traffic flow, according to some embodiments of the disclosure. Network element 202 includes processor 204, (computer-readable non-transitory) memory 206 for storing data and instructions. Furthermore, network element 202 includes service classification function 208 and service header encapsulator 210 (both can be provided by processor 204 when processor 204 executes the instructions stored in memory 206).

The service classification function 208 can process a packet of a traffic flow and determine whether the packet requires servicing and correspondingly which service path to follow to apply the appropriate service. The determination can be performed based on business policies and/or rules stored in memory 206. Once the determination of the service path is made, service header encapsulator 210 generates an appropriate NSH having identification information for the service path ("service path information") and adds the NSH to the packet. The service header encapsulator 210 provides an outer encapsulation to forward the packet to the start of the service path. Other SFC-aware network elements are thus able to process the NSH while other non-SFC-aware network elements would simply forward the encapsulated packets as is. Besides inserting an NSH, network element 202 can also remove the NSH if the service classification function 208 determines the packet does not require servicing.

Network Service Headers

A network service header (NSH) can include a (e.g., 64-bit) base header, and one or more context headers. Generally speaking, the base header provides information about the service header and service path identification (e.g., a service path identifier), and context headers can carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location within a path. The (variable length) context headers can carry opaque metadata and variable length encoded information. The one or more optional context headers make up a context header section in the NSH. For instance, the context header section can include one or more context header fields having pieces of information therein, describing the packet/frame.

The context header fields are particularly suitable for sharing context information about a packet or frame as the packet or frame traverses the service path. Based on the information in the base header, a service function of a service node can derive policy selection from the NSH. Context headers shared in the NSH can provide a range of service-relevant information such as traffic classification. Service functions can use NSH to select local service policy. A common usage is for service functions to deny or permit certain types of traffic based on the traffic classification in the context headers of the NSH.

Service Nodes and Proxy Nodes

Figure 3:
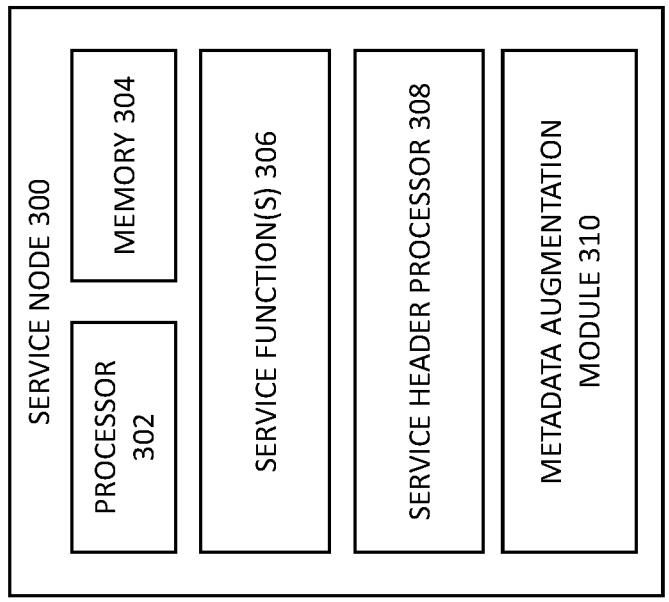
FIG. 3 is a schematic block diagram of a system view of a service node, according to some embodiments of the disclosure.

Once properly encapsulated, the packet having the NSH is then forwarded to one or more service nodes where service(s) can be applied to the packet/frame. FIG. 3 shows a system view of a service node, according to some embodiments of the disclosure. Service node 300, generally a network element, can include processor 302, (computer-readable non-transitory) memory 304 for storing data and instructions. Furthermore, service node 300 includes service function(s) 306 (e.g., for applying service(s) to the packet/frame, classifying the packet/frame) and service header processor 308. The service functions(s) 306 and service header processor 306 can be provided by processor 302 when processor 302 executes the instructions stored in memory 304. Service header processor 308 can extract the NSH, and in some cases, update the NSH as needed. For instance, the service header processor 308 can decrement the service index if a service index=0 is used to indicate that a packet is to be dropped by the service node 300. In another instance, the service header processor 308 or some other suitable module provide by the service node can update context header fields if new/updated context is available.

Aspects of service function chaining can be further found in Internet Engineering Task Force (IETF) publication Penno et al. "Packet Generation in Service Function Chains", available at tools.ietf.org/html/draft-penno-sfc-packet-01, the contents of which are hereby incorporated by reference in their entirety.

When a Service Function (SF) wants to send packets to the reverse direction back to the source, the SF can use a reverse service path ID (such as a symmetric service path ID) and an associated service index. This symmetric service Path ID information is not normally available to SFs since SFs do not need to perform a next-hop service lookup. This disclosure describes how the SF can identify a symmetric service path ID and corresponding associated service index:

In some embodiments, the SF can derive reverse service path forwarding information from an incoming packet.

In some embodiments, the SF can send the packet in the forward direction but set appropriate bits in the network service header (NSH) requesting a SFF to send the packet back to the source.

In some embodiments, the classifier can encode all information the SF needs to send a reverse packet in the metadata header.

In some embodiments, a controller uses a deterministic algorithm when creating the associated symmetric path-id and index.

Embodiment 1

In a first embodiment, the SF can derive the reverse service path forwarding information. The SF can be configured to receive and process a subset of the information from an incoming, original packet. When a SF wants to send a packet to the source, the SF uses information conveyed via the control plane to impose the correct NSH values.

FIG. 4 is a process flow diagram 400 for a service function to use control plane information to impose NSH values. The SF can receive a packet (402). A policy or other trigger can cause the SF to generate a reverse packet (404). A reverse packet is one that traverses the same service functions as the original packet, but in a reverse direction. The controller can determine the reverse path ID from control plane information from the original packet (406). The controller can determine a reverse path index from control plane information (408). The SF can then forward the packet to the reverse hop SF through the SFF (410). The SFF can interpret the reverse path information for forwarding packets to another service function.

Advantages of this embodiment include:
Changes are restricted to SF and controller, no changes to SFF;
Incremental deployment possible;
No protocol between SF and SFF, which avoids interoperability issues; and
No performance penalty on SFF due to in or out-of-band protocol.

Embodiment 2

Figure 5:
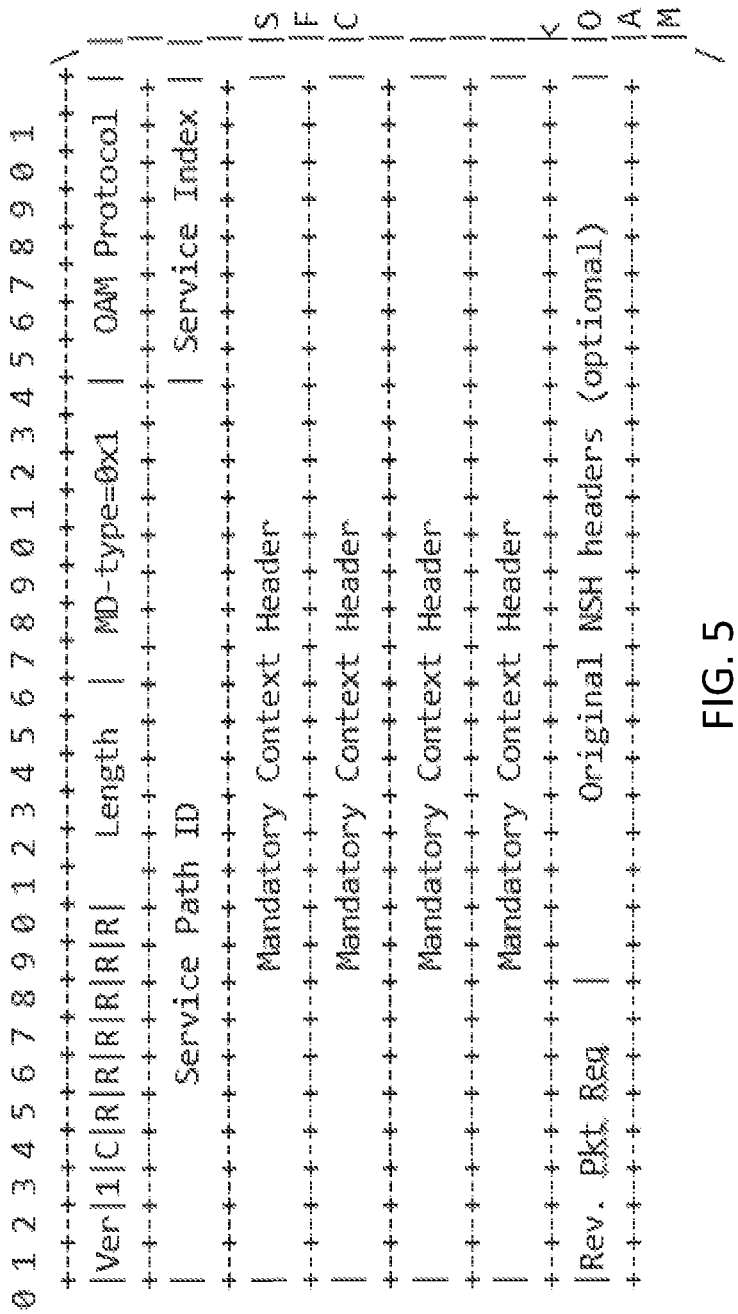
FIG. 5 is a schematic diagram of a network service header of a packet that includes a reverse packet request bit field in accordance with embodiments of the present disclosure.

In some embodiments, the SF can set an OAM bit in the packet header. When the SF needs to send a packet in the reverse direction it will set the OAM bit in the NSH header and use an OAM protocol [I-D.penno-sfc-trace] to request that the SFF impose a new, reverse-path NSH. Post imposition, the SFF forwards the packet correctly. FIG. 5 is a schematic diagram of a network service header 500 of a packet that includes a reverse packet request bit field.

Figure 6:
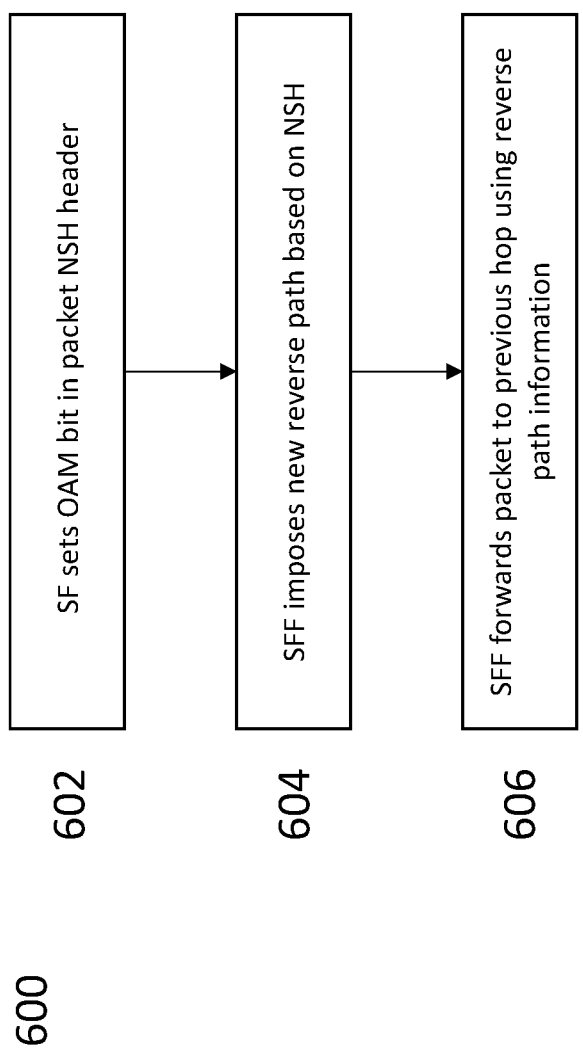
FIG. 6 is a process flow diagram for setting an OAM bit for reverse path forwarding in accordance with embodiments of the present disclosure.

In an example embodiment, the following bit fields can be set by the SF to request a reverse packet:
OAM Bit: 1
Length: 6
MD-Type: 1
Next Protocol: OAM Protocol
Rev. Pkt Req: 1 Reverse packet request FIG. 6 is a process flow diagram 600 for setting an OAM bit for reverse path forwarding. The SF can receive a packet and a reverse packet can be triggered based off a policy or other triggering event. The SF can set an operation, administration, and maintenance (OAM) bit in the reverse packet NSH (602). The OAM bit serves as an indication to the SFF to set a new reverse path based on other information encoded into the packet header (604). The SFF can then forward the reverse packet to the appropriate reverse hop destination (606). The SFF examine its forwarding tables and find the reverse path-id and index of the next service-hop. The reverse path can be found in the Rendered Service Path Yang model that is conveyed to the SFF when a path is constructed.

If a SFF does not understand the OAM message it just forwards the packet based on the original path-id and index. Since it is a special OAM packet, it tells other SFFs and SFs that they should process it differently. For example, a downstream intrusion detection SF might not associate flow state with this packet.

Figure 7:
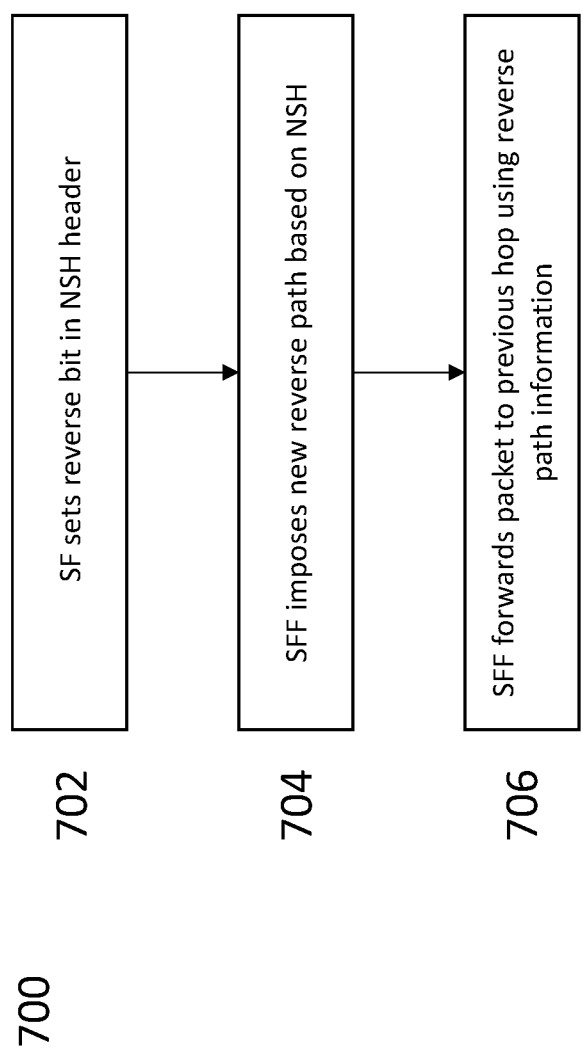
FIG. 7 is a process flow diagram for setting an reverse bit for reverse path forwarding in accordance with embodiments of the present disclosure.

In some embodiments, the SF can set a reserved bit to trigger the SFF to identify the reverse path and forward the packet. FIG. 7 is a process flow diagram 700 for setting a reverse bit for reverse path forwarding. In this embodiment, the SF sets a reversed bit in the NSH of the reverse packet (702). The reserve bit carries the same semantic information as in the OAM embodiment described with FIG. 6 above. The SFF can interpret the reserve bit to be an instruction for the SFF to identify the reverse path and impose the reverse path on the reverse packet (704). The SFF can then forward the reverse packet to the reverse next hop destination (706).

This embodiment involves allocating one of the reserved bits. Another issue is that the metadata in the original packet might be overwritten by SFs or SFFs in the path.

In the embodiments described in FIGS. 6 and 7, when a SFF receives a NSH packet with the reversed bit set, the SFF shall look up a preprogrammed table to map the Service Path ID and Index in the NSH packet into the reverse Service Path ID and Index. The SFF would then use the new reverse ID and Index pair to determine the SF/SFF which is in the reverse direction.

Embodiment 3

The classifier can encode all information the SF needs to send a reverse packet in the metadata header. This embodiment allows the Service Function to send a reverse packet without interactions with the controller or SFF. Also, the SF does not need to have the OAM bit set or use a reserved bit. The penalty is that for a MD Type-1 packet, a significant amount of information (48 bits) may be encoded in the metadata section of the packet and this data should not be overwritten.

Ideally this metadata would need to be added by the classifier. The Rendered Service Path yang model [RSPYang] provides the reverse service path information that a classifier would need to add to the metadata header.

A classifier encodes the requisite reverse service path information—path ID and index—along the service path, allowing the Service Function to send a reverse packet without interactions with the controller or SFF, therefore it is very attractive.

The Rendered Service Path yang model [RSPYang] already provides all the necessary information that a classifier would need to add to the metadata header. An explanation of this method is better served with an example. Below, JSON objects to two symmetric paths are illustrated:

```
RENDERED_SERVICE_PATH_RESP_JSON = """
{
   "rendered-service-paths": {
     "rendered-service-path": [
       {
         "name": "SFC1-SFP1-Path-2-Reverse",
         "transport-type": "service-locator:vxlan-gpe",
         "parent-service-function-path": "SFC1-SFP1",
         "path-id": 3,
         "service-chain-name": "SFC1",
         "starting-index": 255,
         "rendered-service-path-hop": [
           {
             "hop-number": 0,
             "service-index": 255,
     "service-function-forwarder-locator": "eth0",
             "service-function-name": "SF3",
             "service-function-forwarder": "SFF3"
           },
           {
             "hop-number": 1,
             "service-index": 254,
             "service-function-forwarder-locator": "eth0",
             "service-function-name": "SF2",
             "service-function-forwarder": "SFF2"
           },
           {
             "hop-number": 2,
             "service-index": 253,
             "service-function-forwarder-locator": "eth0",
             "service-function-name": "SF1",
             "service-function-forwarder": "SFF1"
           }
         ],
         "symmetric-path-id": 2
       },
       {
          "name": "SFC1-SFP1-Path-2",
          "transport-type": "service-locator:vxlan-gpe",
          "parent-service-function-path": "SFC1-SFP1",
          "path-id": 2,
```

-continued

```
          "service-chain-name": "SFC1",
          "starting-index": 253,
          "rendered-service-path-hop": [
            {
              "hop-number": 0,
              "service-index": 253,
              "service-function-forwarder-locator": "eth0",
              "service-function-name": "SF1",
              "service-function-forwarder": " SFF1"
            },
            {
              "hop-number": 1,
              "service-index": 252,
              "service-function-forwarder-locator": "eth0",
              "service-function-name": "SF2",
              "service-function-forwarder": " SFF2"
            },
            {
              "hop-number": 2,
              "service-index": 251,
              "service-function-forwarder-locator": "eth0",
              "service-function-name": "SF3",
     "service-function-forwarder": "SFF3"
            }
          ],
          "symmetric-path-id": 3
       }
     ]
   }
}"""
```

The classifier can1 encode the following information in the metadata:

symmetric path-id=2 (24 bits)
symmetric starting index=253 (8 bits)
symmetric number of hops=3 (8 bits)
starting index=255 (8 bits)

In the method below, it is assumed that the SF will generate a reverse packet after decrementing the index of the current packet. The decremented index is referred to as the current index.

If SF1 wants to generate a reverse packet it can find the appropriate index by applying the following algorithm:

current_index=252 remaining_hops=symmetric_number_hops−starting_index−current_index remaining_hops=3−(255−252)=0 reverse_service_index=symmetric_starting_index−remaining_hops−1 reverse_service_index=next_service_hop_index=253−0−1=252

The "−1" is necessary for the service index to point to the next service_hop.

If SF2 wants to send reverse packet:

current index=253 remaining_hops=3−(255−253)=1 reverse_service_index=next_service_hop_index=253−1−1=251

IF SF3 wants to send reverse packet:

current index=254 remaining_hops=3−(255−254)=2 reverse_service_index=next_service_hop_index=253−2−1=250

The following tables summarize the service indexes as calculated by each SF in the forward and reverse paths respectively.

Fwd SI=forward Service Index
Cur SI=Current Service Index
Gen SI=Service Index for Generated packets
RSFP1 Forward—
Number of Hops: 3
Forward Starting Index: 253
Reverse Starting Index: 255

| SF | SF1 | SF2 | SF3 |
|---|---|---|---|
| Fwd SI | 253 | 252 | 251 |
| Cur SI | 252 | 251 | 250 |
| Gen SI | 252 | 253 | 254 |

RSFP1 Reverse—
Number of Hops: 3
Reverse Starting Index: 255
Forward Starting Index: 253

| SF | SF1 | SF2 | SF3 |
|---|---|---|---|
| Rev SI | 253 | 254 | 255 |
| Cur SI | 252 | 253 | 254 |
| Gen SI | 252 | 251 | 250 |

Service indexes generated by each SF in the symmetric forward and reverse paths.

Figure 8:
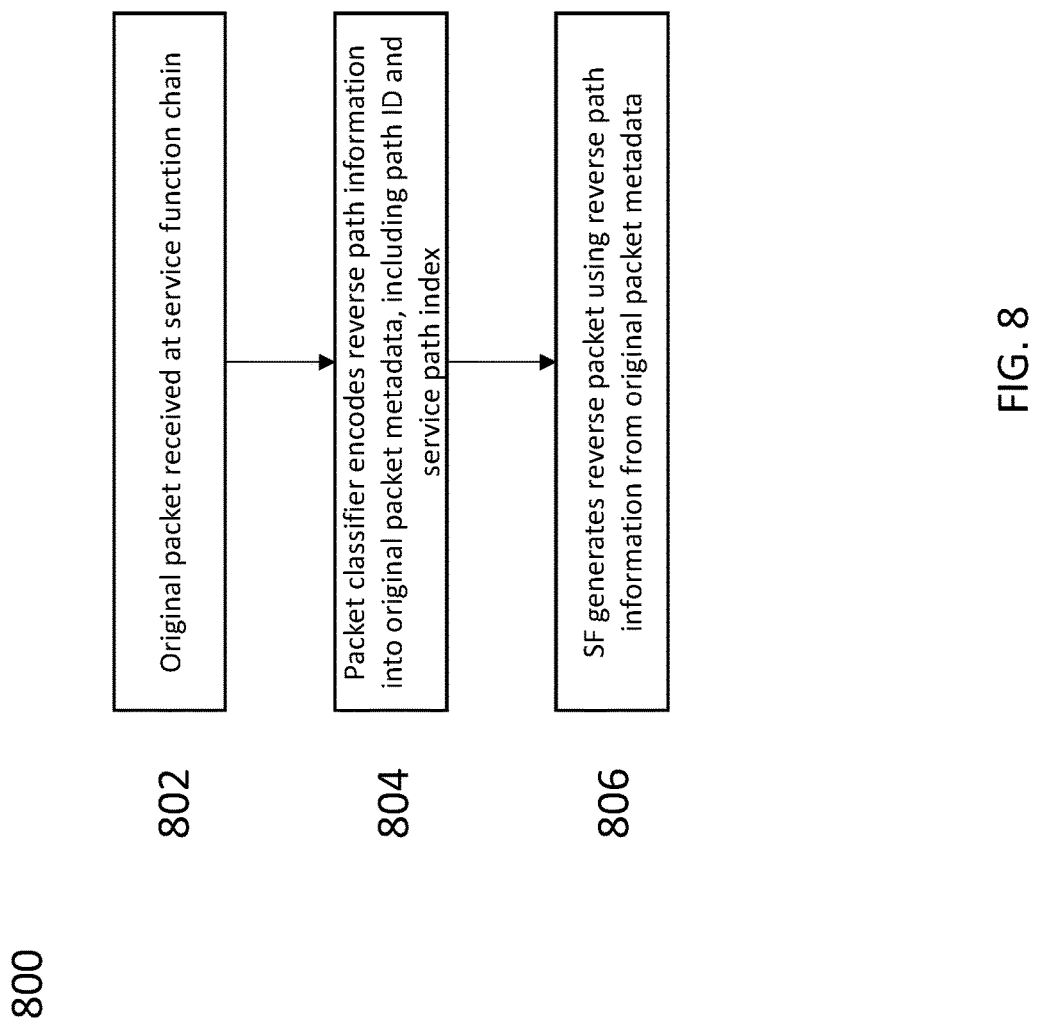
FIG. 8 is a process flow diagram for a classifier to encode reverse path information in accordance with embodiments of the present disclosure.

FIG. 8 is a process flow diagram 800 for a classifier to encode the reverse path information into a packet metadata. An original packet can be received at a classifier of a service function chain (802). The classifier can encode the reverse path information into packet metadata (804). The reverse path information can include a rendered service function path and/or a rendered reverse service path. The SF can then generate reverse packets using metadata extracted from packet metadata (806).

Embodiment 4

In some embodiments, the reverse path derived using Forward Path ID and Indexing. In this embodiment, no extra storage is required from the NSH and the mechanism is completely transparent to SFF. Reverse service path is programmed directly by Orchestrator and used by SF interested in sending upstream traffic.

Instead of defining a new Service Path ID, the same Service Path ID is used. The Orchestrator must define the reverse chain of service functions using a different range of Service Path Index (SPI). It is also assumed that the reverse packet must go through the same number of Services as its forwarding path. It is proposed that Service Path Index 0 . . . 127 and 255 . . . 128 is the exact mirror of each other.

Here is an example: SF1, SF2, and SF3 are identified using SPI 8, 7 and 6 respectively.
Path 100 Index 8—SF1
Path 100 Index 7—SF2
Path 100 Index 6—SF3
Path 100 Index 5—Terminate
At the same time, Orchestrator then programs SPI 248, 249 and 250 as SF1, SF2 and SF3. Orchestrator also programs SPI 247 as "terminate". Reverse-SPI=256-SPI.
Path 100 Index 247—Terminate
Path 100 Index 248 (256-8)—SF1
Path 100 Index 249 (256-7)—SF2
Path 100 Index 250 (256-6)—SF3

If SF3 needs to send the packet in reverse direction, it calculates the new SPI as 256-6 (6 is the SPI of its received packet) and obtained 250. It then subtract the SPI by 1 and sends the packet back to SFF. Subsequently, SFF received the packet and sees the SPI 249. It then diverts the packet to SF2, etc. Eventually, the packet SPI will drop to 247 and the SFF will strip off the NSH and deliver the packet.

The same mechanism works even if SF1 later decided to send back another upstream packet. The packet can ping-pong between SF1 and SF3 using the mechanism described above.

Some embodiments make use of a different Service Path ID, e.g. the most significant bit. The bit can be flipped when the SF needs to send packet in reverse. However, the calculation of the reversed SPI is still required, e.g. SPI 6 becomes SPI 121.

In either case, the SF must have the knowledge through Orchestrator that the reverse service path has been programmed and the method (SPI only or SPI+SPID bit) to use.

Figure 9:
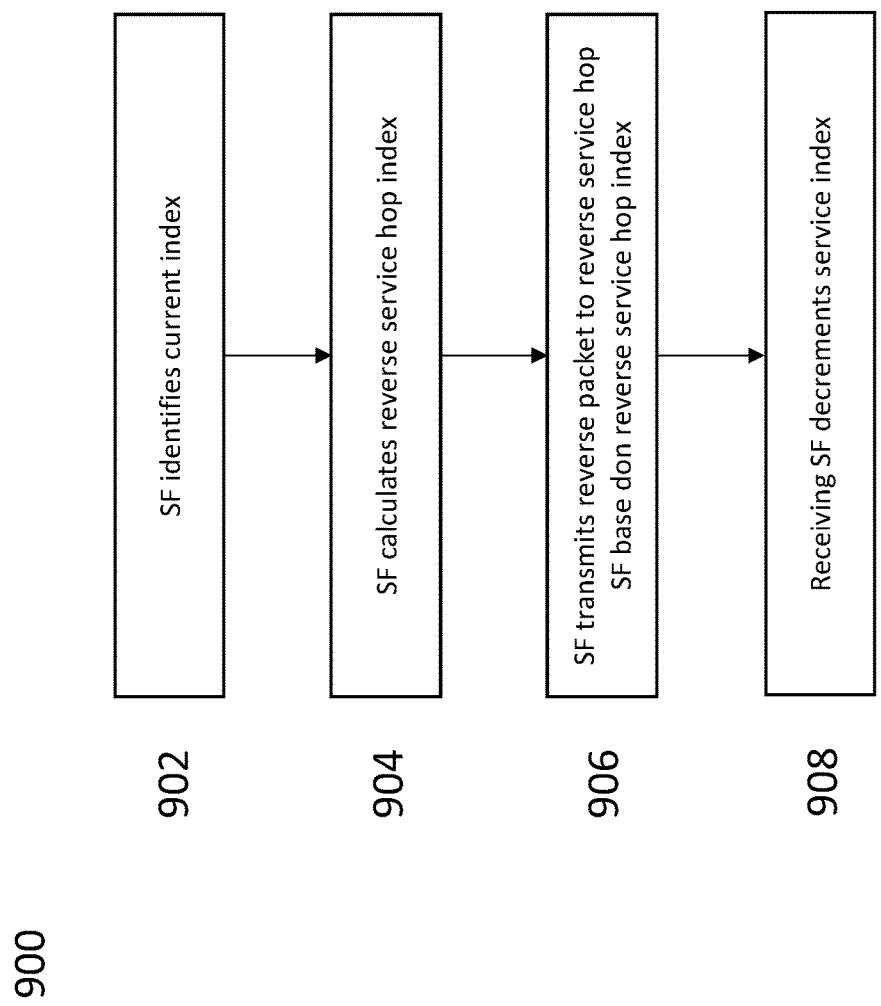
FIG. 9 is a process flow diagram for an orchestrator to calculate reverse path information in accordance with embodiments of the present disclosure.

FIG. 9 is a process flow diagram 900 for calculating a reverse path from forward path information in accordance with embodiments of the present disclosure. The SF can first identify a current index (902). The SF calculates the reverse service hop index corresponding to its own current index (904). The SF can decrement the reverse service hop index for itself to calculate the reverse hop destination SF (906). The SF can then transmit the reverse packet to the SF associated with the reverse service hop destination SF (908). The receiving SF can repeat the calculations to identify the next reverse hop destination SF.

Figure 10:
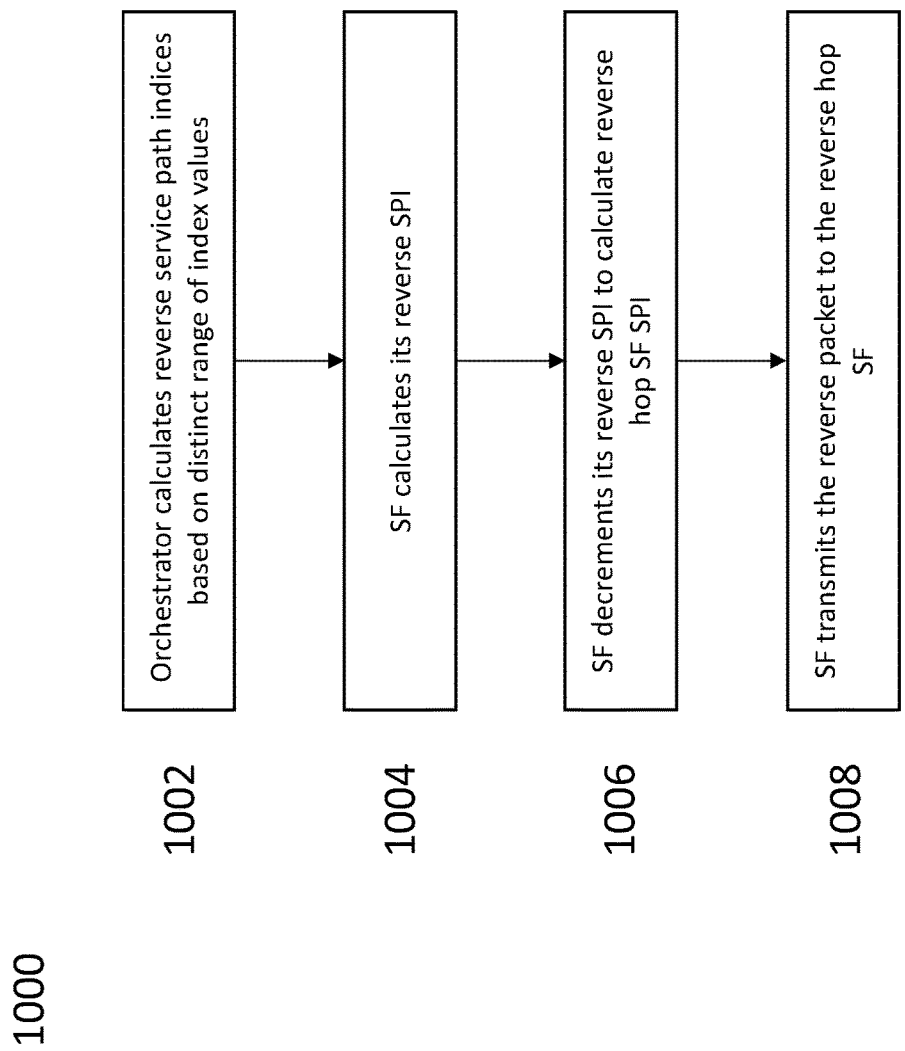
FIG. 10 is another process flow diagram for an orchestrator to calculate reverse path information in accordance with embodiments of the present disclosure.

FIG. 10 is a process flow diagram 1000 for an orchestrator calculating the reverse path in accordance with embodiments of the present disclosure. The orchestrator can identify a reverse service path index based on a distinct range of available index values (1002). For example, the orchestrator can assign a new, distinct index value for each SF. The SF can calculate its reverse service index using information from the orchestrator (1004). The SF can decrement the reverse service index to calculate the reverse next hop SF destination (1006). The SF can transmit the reverse packet to the reverse hop SF (1008).

Asymmetric Service Paths

In some embodiments, the forward and reverse paths can be asymmetric, comprising different set of SFs or SFs in different orders. The forward path can be composed of SF1→SF2→SF4→SF5, while the reverse path skips SF5 and has SF3 in place of SF2 (e.g., SF4→SF3→SF1).

An asymmetric SFC can have completely independent forward and reverse paths. An SF's location in the forward path can be different from that in the reverse path. An SF may appear only in the forward path but not reverse (and vice-versa). In order to use the same algorithm to calculate the service index generated by an SF, one design option is to insert special NOP SFs in the rendered service paths so that each SF is positioned symmetrically in the forward and reverse rendered paths. The SFP corresponding to the example above is:
SFP1 Forward→SF1:SF2:NOP:SF4:SF5
SFP2 Reverse←SF1:NOP:SF3:SF4:NOP The NOP SF is assigned with a sequential service index the same way as a regular SF. The SFF receiving a packet with the service path ID and service index corresponding to a NOP SF should advance the service index till the service index points to a regular SF.

In some implementations, the controller can use a loop-back interface or other methods on the SFF to skip the NOP SFs.

Once the NOP SF is inserted in the rendered service paths, the forward and reverse paths become symmetric. The same algorithm can be applied by the SFs to generate service indexes in the opposite directional path. The following tables list example service indexes corresponding to the example above.

Fwd SI=forward Service Index
Cur SI=Current Service Index
Gen SI=Service Index for Generated packets
RSP1 Forward—
   Number of hops: 5
   Forward Starting Index: 250
   Reverse Starting Index: 255

| SF | SF1 | SF2 | NOP | SF4 | SF5 |
|---|---|---|---|---|---|
| Fwd SI | 250 | 249 | 248 | 247 | 246 |
| Cur SI | 249 | 248 | 247 | 246 | 245 |
| Gen SI | 250 | 251 | N/A | 253 | 254 |

RSP1 Reverse—
   Number of hops: 5
   Reverse Starting Index: 255
   Forward Starting Index: 250

| SF | SF1 | SF2 | NOP | SF4 | SF5 |
|---|---|---|---|---|---|
| Rev SI | 251 | 252 | 253 | 254 | 255 |
| Cur SI | 250 | 251 | 252 | 253 | 254 |
| Gen SI | 249 | N/A | 247 | 246 | N/A |

This symmetrization of asymmetric paths could be performed by a controller during path creation.

FIG. 11 is a process flow diagram for making symmetric an asymmetric forward and reverse service path in accordance with embodiments of the present disclosure. A service function path for a forward direction can be identified (1102). A service function path for a forward direction can be identified (1104). The differences in service functions between forward path and reverse path can be determined (1106). That is, the SFs that are missing from the forward service path, but that are present in the reverse path, can be identified. Similarly, the SFs that are missing from the reverse service path, but that are present in the forward path, can be identified. A NOP (placeholder SF) can be inserted for missing SFs in forward service function path (1108). A NOP (placeholder SF) can be inserted for missing SFs in revere service function path (1110). A discrete set of service indices can be mapped to each SF in forward path, including NOP (1112). A discrete set of service indices can be mapped to each SF in reverse path, including NOP (1114). The forward and reverse_service paths can be rendered (1116) and the packet forwarded. The packet is forwarded through the service chain, and when a NOP is reached, the service_ index is decremented and the packet forwarded to the next non-NOP SF (1118).

Metadata

A crucial consideration when generating a packet is which metadata should be included in the context headers. In some scenarios if the metadata is not present the packet will not reach its intended destination. Although one could think of many different ways to convey this information, the techniques should require little or no new Service Function functionality.

It is assumed that a Service Function normally needs to know the semantics of the context headers in order to perform its functions. But clearly knowing the semantics of the metadata is not enough. The issue is that although the SF knows the semantics of the metadata when it receives a packet, it might not be able to generate or retrieve the correct metadata values to insert in the context headers when generating a packet. It is usually the classifier that insert the metadata in the context headers.

This disclosure describes service-path-invariant metadata. This is metadata that is the same for all packets traversing a certain path. For example, if all packets exiting a service-path need to be routed to a certain VPN, the VPN ID would be a path-invariant metadata. Since the controller needs to send the semantics of the metadata present in the context headers to each Service Function, it is straightforward to send along the values of the path-invariant metadata. Therefore when the Service Function generates a packet in can insert the minimum required metadata for a packet to reach its destination.

There is a second type of metadata that the Service Function can provide the appropriate values, the one that it would be responsible for inserting anyway as part of packet processing.

Finally if the packet needs crucial metadata values that cannot be supplied by the two methods above then a reclassification is needed. This reclassification would need to be done by the classifier that would normally process packets in the reverse path or a SFF that had the same rules and capabilities. Ideally the first SFF that processes the generated packet.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method comprising:
receiving an original packet at a service function of a service function chain, the service function chain comprising a plurality of service functions forming a service function path in a forward direction;
determining, for a reverse packet, a reverse service path identifier for a return service path for the reverse packet that is in a reverse direction from the service function path;
determining, for the reverse packet, a service index for a previous hop on the service function chain from the service function, wherein the previous hop is one of the plurality of service functions of the service function chain; and
transmitting the reverse packet to the previous hop on the service function chain along the return service path.

2. The method of claim 1, wherein determining the reverse service path identifier comprises receiving the reverse service path identifier from a service function forwarder.

3. The method of claim 1, further comprising identifying, from the original packet, service path identification information from metadata included in the original packet.

4. The method of claim 1, wherein the original packet comprises metadata that comprises the reverse service path identifier; and wherein determining the reverse service path identifier comprises identifying the reverse service path identifier from the metadata of the original packet.

5. The method of claim 1, wherein determining the reverse service path comprises:
identifying a service path index from metadata in the original packet; and
calculating a reverse service path index based on the service path index from the metadata in the original packet.

6. The method of claim 5, wherein calculating the reverse service path index based on the service path index from the original packet comprises:
identifying a service index for a service function associated with the service path index;
assigning a new distinct index value to the service function, the new distinct index value correlating to a same service function as the service function associated with the service index; and
calculating the reverse service path index using the new distinct index values for each service function in the service path index from the original packet.

7. The method of claim 1, wherein determining the service index for the previous hop on the service function chain from the service function comprises:
determining a number of remaining hops to a source of the original packet; and
decrementing a starting index included in metadata of the original packet by one and the number of remaining hops to calculate the service index for the previous hop.

8. The method of claim 7, wherein the number of remaining hops is determined based on a current index of the service function, the starting index, and a symmetric number of hops included in the metadata of the original packet.

9. A computer-readable non-transitory medium comprising one or more instructions for forwarding a packet in a reverse direction, that when executed on a processor configure the processor to:
receive an original packet at a service function of a service function chain, the service function chain comprising a plurality of service functions forming a service function path in a forward direction;
determine, for a reverse packet, a reverse service path identifier for a return service path for the reverse packet that is in a reverse direction from the service function path;
determine, for the reverse packet, a service index for a previous hop on the service function chain from the service function, wherein the previous hop is one of the plurality of service functions of the service function chain; and
transmit the reverse packet to the previous hop on the service function chain along the return service path.

10. The computer-readable non-transitory medium of claim 9, wherein determining the reverse service path identifier comprises receiving the reverse service path identifier from a service function forwarder.

11. The computer-readable non-transitory medium of claim 9, further comprising identifying, from the original packet, service path identification information from metadata included in the original packet.

12. The computer-readable non-transitory medium of claim 9, wherein the original packet comprises metadata that comprises the reverse service path identifier; and wherein determining the reverse service path identifier comprises identifying the reverse service path identifier from the metadata of the original packet.

13. The computer-readable non-transitory medium of claim 9, wherein determining the reverse service path comprises:
identifying a service path index from metadata in the original packet; and
calculating a reverse service path index based on the service path index from the metadata in the original packet.

14. The computer-readable non-transitory medium of claim 13, wherein calculating the reverse service path index based on the service path index from the original packet comprises:
identifying a service index for a service function associated with the service path index;
assigning a new distinct index value to the service function, the new distinct index value correlating to a same service function as the service function associated with the service index; and
calculating the reverse service path index using the new distinct index values for each service function in the service path index from the original packet.

15. The computer-readable non-transitory medium of claim 9, wherein the instructions that, when executed by the processor to determine the service index for the previous hop on the service function chain from the service function comprise instructions that cause the processor to:
determine a number of remaining hops to a source of the original packet; and
decrement a starting index included in metadata of the original packet by one and the number of remaining hops to calculate the service index for the previous hop.

16. An orchestrator network element comprising:
at least one memory element having instructions stored thereon;
at least one processor coupled to the at least one memory element and configured to execute the instructions to cause the orchestrator network element to:
receive an original packet at a service function of a service function chain, the service function chain comprising a plurality of service functions forming a service function path in a forward direction;

determine, for a reverse packet, a reverse service path identifier for a return service path for the reverse packet that is in a reverse direction from the service function path;

determine, for the reverse packet, a service index for a previous hop on the service function chain from the service function, wherein the previous hop is one of the plurality of service functions of the service function chain; and transmit the reverse packet to the previous hop on the service function chain along the return service path.

17. The orchestrator network element of claim 16, wherein the at least one processor is configured to determine the service index for the previous hop on the service function chain from the service function by:

determining a number of remaining hops to a source of the original packet; and decrementing a starting index included in metadata of the original packet by one and the number of remaining hops to calculate the service index for the previous hop.

18. The orchestrator network element of claim 16, wherein determining the reverse service path identifier comprises receiving the reverse service path identifier from a service function forwarder.

19. The orchestrator network element of claim 16, further comprising identifying, from the original packet, service path identification information from metadata included in the original packet.

20. The orchestrator network element of claim 16, wherein the original packet comprises metadata that comprises the reverse service path identifier; and wherein determining the reverse service path identifier comprises identifying the reverse service path identifier from the metadata of the original packet.

21. The orchestrator network element of claim 16, wherein determining the reverse service path comprises:

identifying a service path index from metadata in the original packet; and calculating a reverse service path index based on the service path index from the metadata in the original packet.

22. The orchestrator network element of claim 21, wherein calculating the reverse service path index based on the service path index from the original packet comprises:

identifying a service index for a service function associated with the service path index;

assigning a new distinct index value to the service function, the new distinct index value correlating to a same service function as the service function associated with the service index; and calculating the reverse service path index using the new distinct index values for each service function in the service path index from the original packet.

* * * * *